United States Patent
Krishnamoorthi et al.

(10) Patent No.: US 10,083,368 B2
(45) Date of Patent: Sep. 25, 2018

(54) INCREMENTAL LEARNING FOR DYNAMIC FEATURE DATABASE MANAGEMENT IN AN OBJECT RECOGNITION SYSTEM

(71) Applicant: QUALCOMM Incorporated, San Diego, CA (US)

(72) Inventors: Raghuraman Krishnamoorthi, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 14/166,620

(22) Filed: Jan. 28, 2014

(65) Prior Publication Data
US 2015/0213325 A1    Jul. 30, 2015

(51) Int. Cl.
| | |
|---|---|
| *G06K 9/66* | (2006.01) |
| *G06K 9/62* | (2006.01) |
| *G06T 7/00* | (2017.01) |
| *G06F 17/30* | (2006.01) |
| *G06T 19/00* | (2011.01) |
| *G06K 9/46* | (2006.01) |
| *H04N 101/00* | (2006.01) |

(52) U.S. Cl.
CPC ...... *G06K 9/6211* (2013.01); *G06F 17/30256* (2013.01); *G06F 17/30268* (2013.01); *G06F 17/30277* (2013.01); *G06K 9/4671* (2013.01); *G06K 9/6255* (2013.01); *G06K 9/6262* (2013.01); *G06T 7/0002* (2013.01); *G06T 19/006* (2013.01); *G06T 2200/28* (2013.01); *G06T 2207/10004* (2013.01); *H04N 2101/00* (2013.01)

(58) Field of Classification Search
CPC .. G06K 9/4671; G06K 9/6211; G06K 9/6255; G06K 9/62; G06F 17/30244; G06F 17/30256; G06F 17/30268; G06T 2207/10004; G06T 2200/28; G06T 19/006
USPC ......................................................... 382/190
See application file for complete search history.

(56) References Cited

U.S. PATENT DOCUMENTS

| | | | |
|---|---|---|---|
| 7,064,776 B2 | 6/2006 | Sumi et al. | |
| 9,036,925 B2 * | 5/2015 | Vaddadi et al. | ............... 382/225 |
| 2008/0075334 A1 | 3/2008 | Determan et al. | |

(Continued)

FOREIGN PATENT DOCUMENTS

| | | |
|---|---|---|
| EP | 1835460 A1 | 9/2007 |
| WO | 2013079098 A1 | 6/2013 |
| WO | 2014015889 A1 | 1/2014 |

OTHER PUBLICATIONS

International Search Report and Written Opinion—PCT/US2015/012953—ISA/EPO—dated Apr. 23, 2015.

(Continued)

*Primary Examiner* — Manuchehr Rahmjoo
(74) *Attorney, Agent, or Firm* — Austin Rapp

(57) ABSTRACT

A method of dynamically updating a feature database that contains features corresponding to a known target object includes providing an image, extracting a first set of features from within the captured image, and comparing the first set of features to the features stored in the feature database. If it is determined that the target object is present in the image then at least one of the extracted features of the first set that are not already included in the feature database are added to the feature database.

25 Claims, 4 Drawing Sheets

(56) References Cited

U.S. PATENT DOCUMENTS

2012/0011119 A1    1/2012  Baheti et al.
2012/0011142 A1*   1/2012  Baheti et al. ............... 707/769
2012/0169895 A1    7/2012  Wan et al.
2012/0288152 A1   11/2012  Yano

OTHER PUBLICATIONS

McClean E., "An augmented reality system for urban environments using a planar building façade model", Jan. 1, 2013 (Jan. 1, 2013), XP055182411, Retrieved from the Internet: URL:http://search.proquest.com/docview/1535029816, pp. 1-90, [retrieved on Apr. 13, 2015].
Pilet J et al., "Virtually augmenting hundreds of real pictures: An approach based on learning, retrieval, and tracking", 2010 IEEE Virtual Reality Conference (VR), Mar. 1, 2010 (Mar. 1, 2010), pp. 71-78, XP055182490, DOI: 10.1109/VR.2010.5444811, ISBN: 978-1-42-446237-7.
Taylor S., et al., "Robust feature matching in 2.3μs," IEEE Computer Society Conference on Computer Vision and Pattern Recognition Workshops, 2009. CVPR Workshops 2009., pp. 15-22.
Ross, D.A., et al., "Incremental learning for robust visual tracking," Int J Comput Vis (2008) 77: 125-141.
Ang et al., "Visual Information Processing in Wireless Sensor Networks: Technology, Trends and Applications," 2011, IGI Global, pp. 168-169 ISBN: 9781613501542.
Haner S., et al., "Combining Foreground / Background Feature Points and Anisotropic Mean Shift for Enhanced Visual Object Tracking," 2010 20th International Conference on Pattern Recognition (ICPR 2010) : Istanbul, Turkey, Aug. 23-26, 2010, IEEE, Piscataway, Nj, USA, Aug. 23, 2010 (Aug. 23, 2010), pp. 3488-3491, XP031772474, ISBN: 978-1-4244-7542-1.

* cited by examiner

INCREMENTAL LEARNING FOR DYNAMIC FEATURE DATABASE MANAGEMENT IN AN OBJECT RECOGNITION SYSTEM

TECHNICAL FIELD

This disclosure relates generally to computer vision based object recognition applications, and in particular but not exclusively, relates to feature database management.

BACKGROUND INFORMATION

A challenge to enabling Augmented Reality (AR) on mobile phones or other mobile platforms is the problem of detecting and tracking objects in real-time. Object detection for AR applications has very demanding requirements: it must deliver full six degrees of freedom, give absolute measurements with respect to a given coordinate system, be very robust and run in real-time. Of interest are methods to compute camera pose using computer vision (CV) based approaches, which rely on first detecting and, subsequently, tracking objects within the camera view. In one aspect, the detection operation includes detecting a set of features contained within the digital image in order for those features to be compared against a database of known features corresponding to real-world objects. A feature may refer to a region in the digital image that differs in properties, such as brightness or color, compared to areas surrounding that region. In one aspect, a feature is a region of a digital image in which some properties are constant or vary within a prescribed range of values.

The extracted features are then compared to known features contained in a feature database in order to determine whether a real-world object is present in the image. Thus, an important element in the operation of a vision-based AR system is the composition of the feature database. In many systems, the feature database is built pre-runtime by taking multiple sample images of known target objects from a variety of known viewpoints. Features are then extracted from these sample images and added to the feature database. However, once the feature database is created the features contained in the database remain static and therefore the detection performance of systems using such a database also remains static.

BRIEF SUMMARY

According to one aspect of the present disclosure, a method of dynamically updating a feature database that contains features corresponding to a known target object includes providing an image, extracting a first set of features from within the provided image, and comparing the first set of features to the features stored in the feature database. If it is determined that the target object is present in the image then at least one of the extracted features of the first set that are not already included in the feature database are added to the feature database.

The above and other aspects, objects, and features of the present disclosure will become apparent from the following description of various embodiments, given in conjunction with the accompanying drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Reference throughout this specification to "one embodiment", "an embodiment", "one example", or "an example" means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

Figure 1:
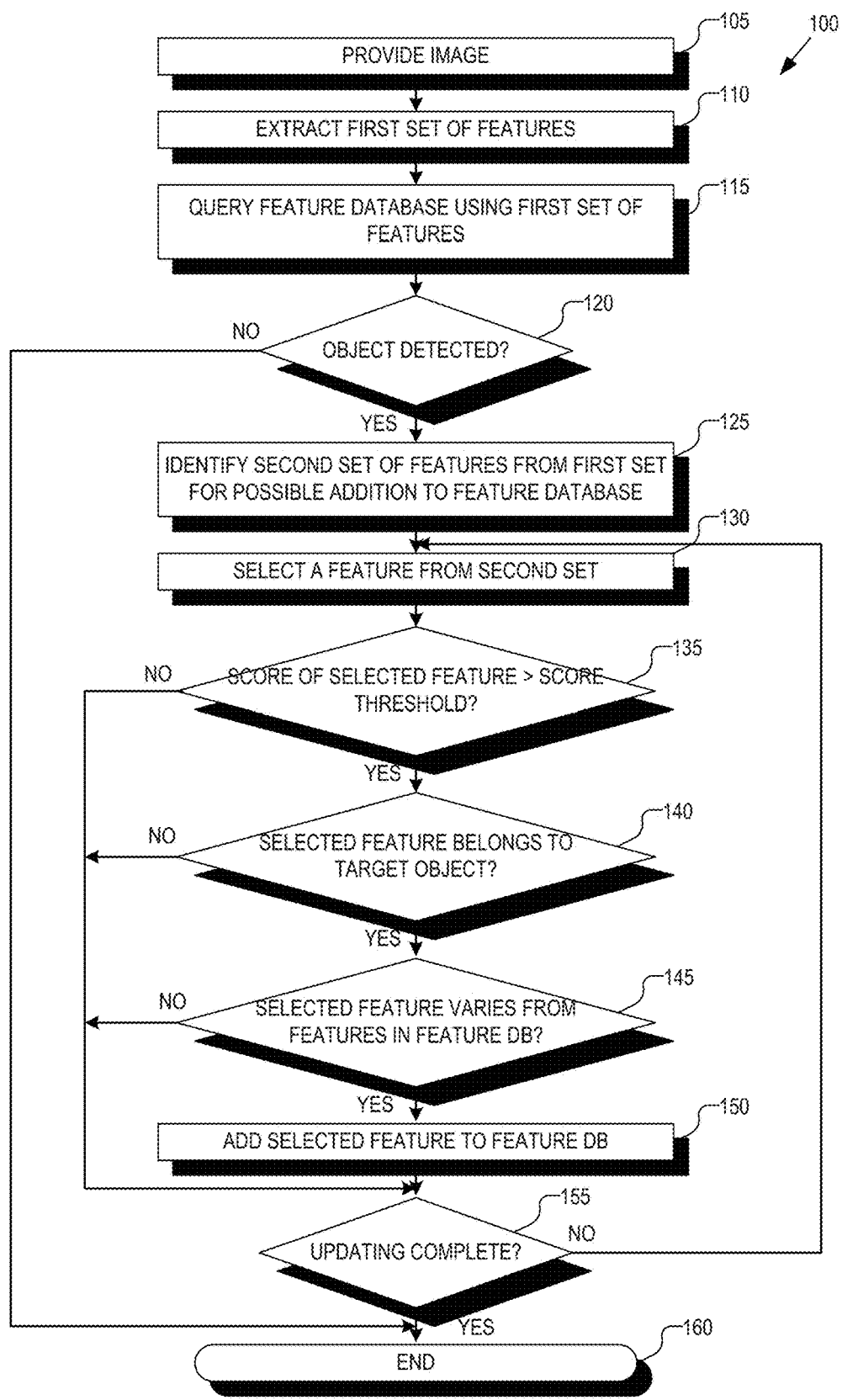
FIG. 1 is a flowchart illustrating a process of dynamically updating a feature database.

FIG. 1 is a flowchart illustrating a process 100 of dynamically updating a feature database included in an object recognition system. First, in process block 105, an image is provided. For example, a device, such as, mobile platform including a camera (such as camera 302 of FIG. 3), captures a digital image of the object and provides the captured image. In other embodiments, the image is provided without reference to who or how the image is captured. Process block 110 then includes extracting a first set of features from within the provided digital image. In one example, feature extraction includes applying a Laplacian of Gaussian (LoG) or a Difference of Gaussians (DoG) based feature detector, such as the Scale Invariant Feature Transform (SIFT) algorithm, to the image in order to extract the first set of features. A feature may include a point of interest or "keypoint" and a description of the region surrounding the interest point.

Next, in process block 115, a feature database is queried using the first set of extracted features. Features stored in the database are built pre-runtime by taking sample image(s) of known target objects. Querying the feature database may include comparing the extracted features with features stored in the feature database to determine if, at least, some of the extracted features of the first set match with features stored in the database. Decision block 120 includes determining whether a target object has been successfully detected in the provided image. Successful detection of a target object may be decided if a number of post-geometry inliers is above a first threshold and if a maximum re-projection error among those inliers is below a second threshold. Of course, other known feature-based detection methods may be implemented in accordance with the teachings of the present disclosure. If detection is not successful, then process 100 ends at block 160. If however, in decision block 120, a successful detection of the target object has been identified, process 100 proceeds to process block 125 where a process of updating the feature database is commenced. In one embodiment, the camera pose may be updated upon a successful detection of an object.

Next, in process block 125, a second set of features is formed. The second set of features includes extracted features of the first set that are not already included in the feature database. In one embodiment, the second set of features includes those features of the first set of which correspondences were not found when the feature database was queried in process block 115. If no features are included in the second set (i.e., correspondences were found for all features of the first set) then process 100 may proceed to block 160 where process 100 ends. In an alternative embodiment, the second set of features includes all extracted features that are known to belong to the object of interest, so that they be used in the subsequent pruning process, as will be described in more detail below. Process block 130 then includes selecting one of the features from the second set to determine whether to add that feature to the feature database. However, rather than simply adding all extracted features to the feature database, process 100 may be selective in which features to add to the feature database to restrict size of the database and to ensure those features added aide in successive detection attempts.

Thus, decision block 135 may include assigning a score to the selected feature and comparing that score to a score threshold. If the score is not high enough then the selected feature is not added to the feature database and process 100 skips ahead to decision block 155. In one embodiment, the score of a selected feature is based on an aspect of the features, such as local measure of curvature and/or a measure of corner strength. In another embodiment the score of the selected feature may be a measure a feature's "blobness"; that is, whether the feature is more blob-like or edge-like. A blob-like feature may be regarded as one that is more circular, while an edge-like feature is more elliptical. Continuing with this example, the eigenvalues of the Hessian matrix are computed for a selected feature. The ratio of the maximum eigenvalue to the minimum eigenvalue may be used as a measure of the feature's blobness (i.e., score). For example, an eignevalue ratio (E_RATIO) may be computed according to equation 1, as follows:

$$E\_RATIO = \frac{\lambda_1}{\lambda_2} \qquad \text{EQ. 1}$$

If in decision block 135, it is determined that the score of the selected feature is high enough then decision block 140 determines whether the selected feature belongs to the target object. Deciding whether an extracted feature belongs to the target object may include determining a location of those extracted features in object coordinates (i.e., location of a feature with respect to other known features of the target object). Determining the location of an extracted feature may be based on the known location of the feature in image coordinates, the known object model (i.e., the feature database), and a computed camera pose (i.e., location and orientation of camera with respect to the target object). An extracted feature "belongs" to the target object if its location in object coordinates lays on the target object. Alternative solutions are possible which include a measured depth of extracted features and a known camera pose, or alternative object segmentation techniques based on known background properties.

If it is determined, in decision block 140 that the selected feature does not belong to the target object then the selected feature is not added to the feature database and process 100 proceeds to decision block 155. Next, decision block 145 includes determining whether the selected feature varies sufficiently from features already included in the feature database. In one embodiment, the selected feature varies from features in the feature database if a keypoint location of the selected feature differs from the keypoint locations already in the feature database by a threshold location amount. The selected feature may also vary from features in the feature database if a descriptor of the selected feature differs from descriptors already in the feature database by a threshold descriptor amount. In one embodiment, either the threshold location amount, the threshold descriptor amount, or both may be set to zero, such that all the features in the target object are considered for adding to the feature database. If it is determined that the selected feature varies sufficiently from features already included in the feature database then process block 150 adds the selected feature to the feature database. Although FIG. 1 illustrates three criteria for adding a selected feature to the feature database (i.e., based a feature's score, based on whether a selected feature belongs to the target object, and based on determining whether the selected feature sufficiently varies from features in the feature database), all three criteria need not be implemented in each implementation of process 100. For example, in one embodiment, process 100 may only include determining whether a score of the selected feature is greater than the score threshold in order to determine whether to add the selected feature to the feature database. In another example, process 100 may include decision blocks 140 and 145, and not 135.

Once the selected feature is added to the feature database, process 100 proceeds to decision block 155 to determine whether the updating of feature database is complete. In one embodiment, updating of the feature database is complete if each of the features in the second set of features has been considered for adding to the feature database. If not, process 100 returns to process block 130 to select a next feature from the second set and to determine whether to add it to the feature database. Process 100 completes at block 160.

Accordingly, embodiments of the present disclosure include dynamically improving object detection performance with successive detections of the same target object. The proposed process does not involve deep learning or neural network methods and thus reduces processing overhead. Thus, the process described herein may make a target object more detectable each time it is successfully detected by adding extracted features to the feature database not already included. In one embodiment, where the feature database is cloud-based and shared among multiple users, successful detection and updating of the feature database may benefit all users with no extra effort on their behalf.

Figure 2:
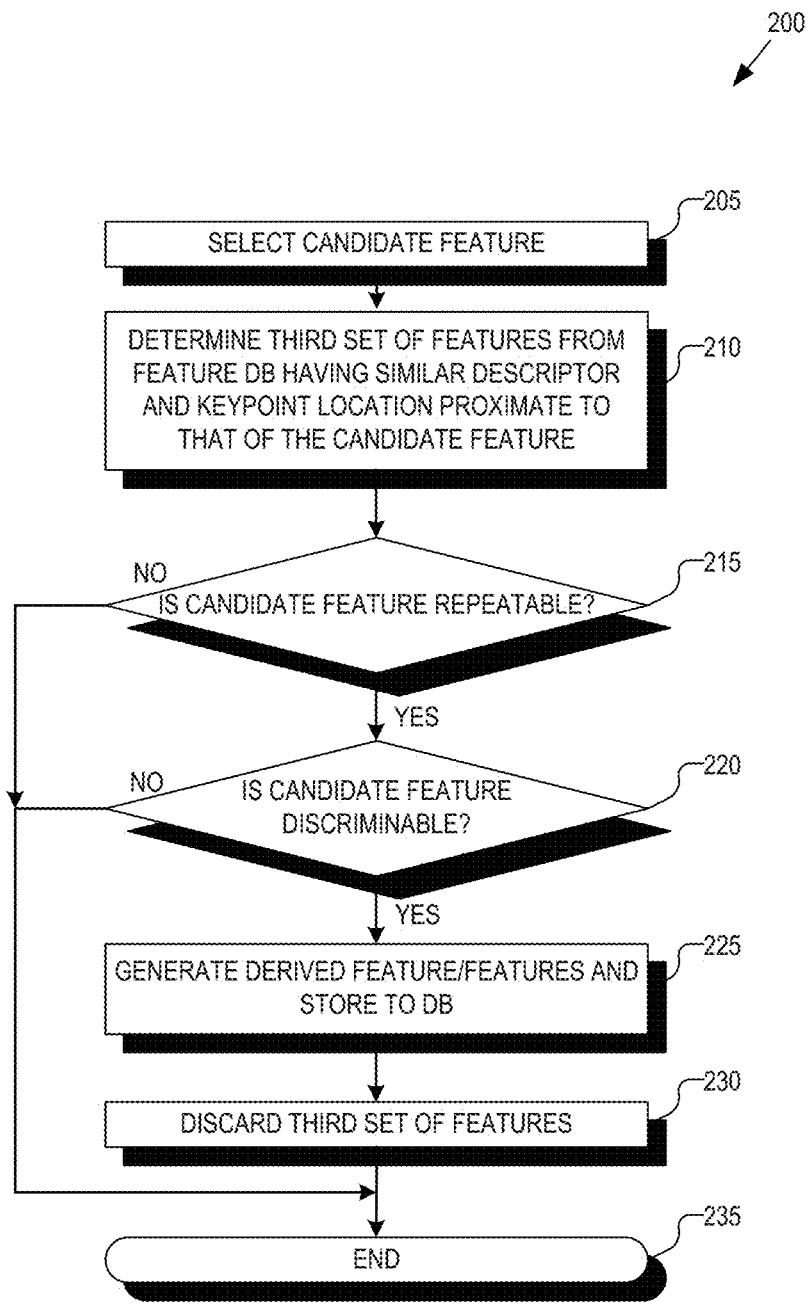
FIG. 2 is flowchart illustrating a process of consolidating the feature database based on a candidate feature to be added to the feature database.

Embodiments of dynamically updating a feature database, as described above may further be combined with a process of feature consolidation in order to reduce (or maintain) the size of the feature database. Embodiments discussed herein provide a feature database for object recognition/detection that is generated by pruning similar features extracted from multi-view sample images of a known object. In general, candidate features are compared to features included in the feature database from which a derived feature that is representative of a group of similar features is then generated and stored in the database. The group of similar features may then be discarded (i.e., pruned). Thus, the database avoids the issue of containing similar features with an unmanageable database size. For example, FIG. 2 is flowchart illustrating a process 200 of consolidating the feature database based on a candidate feature to be added to the feature database.

As shown, process block 205 includes first selecting a candidate feature that is to be added to the feature database. In one embodiment, the candidate feature is an extracted feature from the second set of features to be added to the feature database in process block 150 of process 100. Next, in process block 210, a third set of features is determined based on this candidate feature. For example, process block 210 may include examining the feature database to find features that include both a descriptor that is similar to that of the candidate feature and a keypoint location that is proximate to that of the candidate feature. These matched features are then added to the third set of features.

In one embodiment a descriptor is a L-dimensional vector describing the occurrence of a keypoint from one viewpoint (image). Thus, two descriptors are similar if their difference (which itself is a L-dimensional vector) is small in norm/magnitude. Accordingly, process block 210 may include determining whether two descriptors are similar by subtracting one descriptor from another and comparing the result to a descriptor distance threshold (e.g., $|f_1-f_i|<desc_{th}$, where $desc_{th}$ is the descriptor distance threshold). Determining whether keypoint locations are proximate is similar to that describe above, except that keypoint locations are 3-dimensional vectors of (x,y,z) coordinates according to a pre-defined (or set) coordinate system (e.g., $|k_1-k_i|<dkpt_{th}$, where $dkpt_{th}$ is the keypoint distance threshold).

Accordingly, the third set of features is set of features whose descriptors are similar to that of the candidate feature and also whose keypoint locations are proximate to that of the candidate feature. In one embodiment, the third set of features includes the candidate feature. Once this third set of features is determined, decision blocks 215 and 220, decide whether the candidate feature is both repeatable and discriminable. The repeatability of a feature refers to the number of viewpoints in which the same (or similar) feature is observed and in one example, may just simply be the number of features included in the third set of features. In one embodiment, determining the repeatability of the candidate feature includes determining whether a keypoint location of the candidate feature is observable from multiple distinct viewpoints, and if so determining a number of viewpoints in which the keypoint location of the candidate feature is described by a descriptor similar to the descriptor of the candidate feature. It is noted that this determination of the number of viewpoints includes analysis of the candidate feature's keypoint location, as well as proximally located keypoints (e.g., within the keypoint distance threshold $dkpt_{th}$). Thus, the repeatability may be determined by counting the number of similar observations of a same or proximally located keypoint. In other words, similar descriptors attached to keypoints that are distinct but essentially co-located count as two observations of a same keypoint. Once quantified, the repeatability of the candidate feature may then be compared against a fixed repeatability threshold ($r_i>r_{th}$?).

The discriminability of the features refers to the ability to discriminate between the candidate feature and other features already included in the database. In one example, the discriminability may be quantified as the ratio of the number of features in the third set to the number of all features in the database that have similar descriptors. Determining the discriminability of the candidate feature may include determining a first number of viewpoints in which a keypoint location of the candidate feature (or proximally located keypoints) is described by a descriptor similar to a descriptor of the candidate feature. Then a second number of all features in the feature database that have descriptors similar to the descriptor of the candidate feature, regardless of keypoint location, is determined. The discriminability may then be represented as the ratio between this first number to the second number. In one embodiment, the discriminability is compared against a fixed discriminability threshold to determine whether the discriminability of the candidate feature is high enough ($d_i>d_{th}$?).

If, in decision block 220, it is determined that the selected feature is not discriminable (e.g., $d_i<d_{th}$) then this indicates that the candidate feature is not to be added to the feature database due to low discriminability. If, in decision block 215, it is determined that the selected feature is not repeatable (e.g., $r_i<r_{th}$), then this indicates that the candidate feature is not to be added to the feature database due to low repeatability. In one embodiment, if the repeatability and/or discriminability are too low then similar features, already present in the feature database may be removed.

If, however, the candidate feature is determined to be both repeatable and discriminable, then process 200 proceeds to process block 225, where at least one derived feature is generated and added to the feature database. The derived feature is representative of the third set of features and, in one example, may include a descriptor that is an average of the descriptors included in the third set.

In one example, the derived feature is a single feature representative of all the features included in the third set. In another example, process block 225 includes generating an M number of derived features for the candidate feature, where the M number of derived features are generated by clustering together features of the third set into M number of clusters and then taking cluster centers.

Once the derived feature(s) is added to the database, the features of the third set may then be discarded (i.e., process block 230). In one embodiment, discarding features includes removing them from the feature database.

Figure 3:
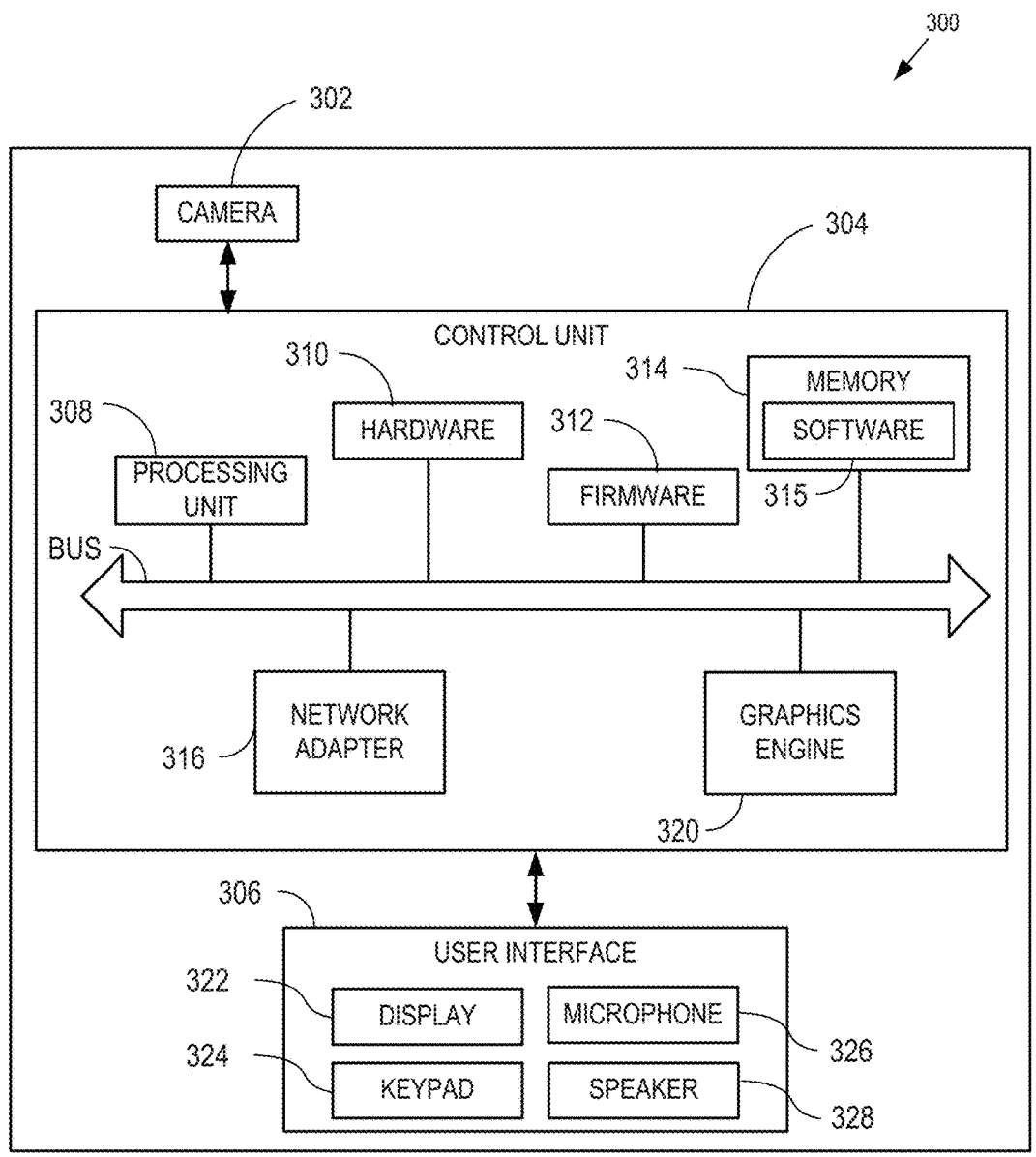
FIG. 3 is a functional block diagram of a mobile platform capable of performing the processes discussed herein.

FIG. 3 is a functional block diagram of a mobile platform 300 capable of performing the processes discussed herein. In one embodiment mobile platform 300 is a computer capable of object recognition and feature database updating using a process such as process 100 of FIG. 1. For example, mobile platform 300 may optionally include a camera 302 for capturing and providing an image as described with reference to process block 105 of FIG. 1. Mobile platform 300 may also include an optional user interface 306 that includes the display 322 capable of displaying images captured by the camera 302. User interface 306 may also include a keypad 324 or other input device through which the user can input information into the mobile platform 300. If desired, the keypad 324 may be obviated by integrating a virtual keypad into the display 322 with a touch sensor. User interface 306 may also include a microphone 326 and speaker 328.

Mobile platform 300 also includes a control unit 304 that is connected to and communicates with the camera 302 and user interface 306, if present. The control unit 304 accepts and processes images received from the camera 302 and/or from network adapter 316. Control unit 304 may be provided by a processing unit 308 and associated memory 314, hardware 310, software 315, and firmware 312.

Control unit 304 may further include a graphics engine 320, which may be, e.g., a gaming engine, to render desired data in the display 322, if desired. Processing unit 308 and graphics engine 320 are illustrated separately for clarity, but may be a single unit and/or implemented in the processing unit 308 based on instructions in the software 315 which is run in the processing unit 308. Processing unit 308, as well as the graphics engine 320 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with mobile platform 300, and is not to be limited to any particular type of memory or number of memories, or type of media upon which memory is stored.

The processes described herein, including processes 100 and 200, may be implemented by various means depending upon the application. For example, these processes may be implemented in hardware 310, firmware 312, software 315, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 315 and executed by the processing unit 308. Memory may be implemented within or external to the processing unit 308.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
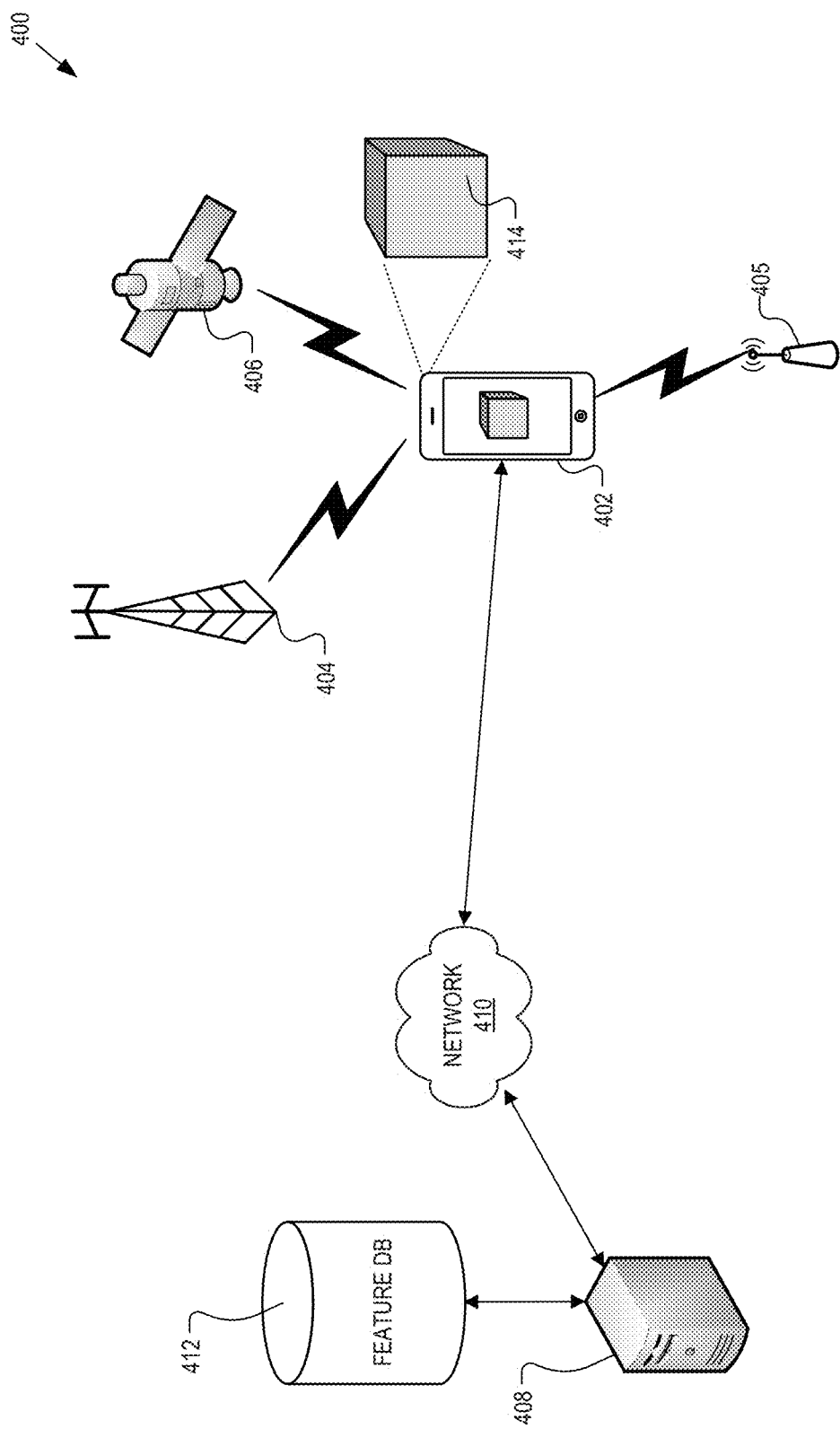
FIG. 4 is a functional block diagram of an object recognition system.

FIG. 4 is a functional block diagram of an object recognition system 400. As shown, object recognition system 400 includes an example mobile platform 402 that includes a camera (not shown in current view) capable of capturing images of an object 414 that is to be identified by comparison to a feature database 412.

The mobile platform 402 may include a display to show images captured by the camera. The mobile platform 402 may also be used for navigation based on, e.g., determining its latitude and longitude using signals from a satellite positioning system (SPS), which includes satellite vehicle(s) 406, or any other appropriate source for determining position including cellular tower(s) 404 or wireless communication access points 405. The mobile platform 402 may also include orientation sensors, such as a digital compass, accelerometers or gyroscopes, that can be used to determine the orientation of the mobile platform 402.

As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile platform" may also include all electronic devices which are capable of augmented reality (AR), virtual reality (VR), and/or mixed reality (MR) applications. Any operable combination of the above are also considered a "mobile platform."

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 406. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 402 is not limited to use with an SPS for position determination, as position determination techniques may be implemented in conjunction with various wireless communication networks, including cellular towers 404 and from wireless communication access points 405, such as a wireless wide area network (WWAN), a wireless local area network (WLAN), a wireless personal area network (WPAN). Further the mobile platform 402 may access one or more servers 408 to obtain data, such as reference images and reference features from a database 412, using various wireless communication networks via cellular towers 404 and from wireless communication access points 405, or using satellite vehicles 406 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 4, system 400 includes mobile platform 402 capturing an image of object 414 to be identified by comparison to a feature database 412. As illustrated, the mobile platform 402 may access a network 410, such as a wireless wide area network (WWAN), e.g., via cellular tower 404 or wireless communication access point 405, which is coupled to a server 408, which is connected to database 412 that stores information related to target objects and their images. In one embodiment, mobile platform 402 includes a network adapter (e.g., network adapter 316 of FIG. 3) for accessing network 410. While FIG. 4 shows one server 408, it should be understood that multiple servers may be used, as well as multiple databases 412. Mobile platform 402 may perform the object detection itself, as illustrated in FIG. 4, by obtaining at least a portion of the database 412 from server 408 and storing the downloaded data in a local database inside the mobile platform 402 (e.g., memory 314 and/or firmware 312 in FIG. 3). The portion of a database obtained from server 408 may be based on the mobile platform's geographic location as determined by the mobile platform's positioning system. Moreover, the portion of the database obtained from server 408 may depend upon the particular application that requires the database on the mobile platform 402. The mobile platform 402 may extract features from a captured query image, match the features to those features that are stored in the feature database, and update the feature database with extracted features not already in the feature database, as described above with regards to process 100. The query image may be an image in the preview frame from the camera or an image captured by the camera, or a frame extracted from a video sequence. The object detection may be based, at least in part, on determined confidence levels for each query feature, which can then be used in outlier removal. By downloading a small portion of the database 412 based on the mobile platform's geographic location and performing the object detection on the mobile platform 402, network latency issues may be avoided and the over the air (OTA) bandwidth usage is reduced along with memory requirements on the client (i.e., mobile platform) side. If desired, however, the object detection may be performed by the server 408 (or other server), where either the query image itself or the extracted features from the query image are provided to the server 408 by the mobile platform 402.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method comprising:
    extracting a first set of features from an image during object detection within the image by a mobile platform;
    comparing the first set of features to features stored in a feature database of an object recognition system;
    determining a target object is present in the image based on some of the features included in the first set of features correlating with at least some of the features included in the feature database;
    identifying a candidate feature from the first set of features extracted from the image during object detection, the candidate feature belonging to the target object and not previously included in the feature database for identification of the target object;
    determining a second set of features using a descriptor and a keypoint associated with the candidate feature, wherein the second set of features comprises the candidate feature and at least one feature selected from the feature database when the at least one feature is determined to have a descriptor similar to the descriptor of the candidate feature and a keypoint with a location within a threshold distance of a location of the keypoint of the candidate feature;

assigning a score to the candidate feature, wherein the score is based on a circularity measure of the candidate feature; and updating the feature database of the object recognition system by adding the candidate feature or a new feature to the feature database based on the score.

2. The computer-implemented method of claim 1, wherein extracting the first set of features from within the provided image includes applying a Scale-Invariant Feature Transform (SIFT) algorithm to the provided image.

3. The computer-implemented method of claim 1, wherein adding the candidate feature to the feature database includes only adding the candidate feature when the score of the candidate feature exceeds a score threshold.

4. The computer-implemented method of claim 3, wherein the score is further based on an aspect of the candidate feature selected from a group consisting of a local measure of curvature and a measure of corner strength.

5. The computer-implemented method of claim 1, wherein the candidate feature is added to the feature database when the candidate feature varies from features already included in the feature database based on a keypoint location of the candidate feature differing from keypoint locations of the features already included in the feature database by more than a threshold amount.

6. The computer-implemented method of claim 1, wherein the candidate feature is added to the feature database when the candidate feature varies from features already included in the feature database based on a keypoint descriptor of the candidate feature differing from keypoint descriptors of the features already included in the feature database by more than a threshold amount.

7. The computer-implemented method of claim 1, wherein the at least one feature is determined to be a member of the second set of features when a difference in descriptor values of the candidate feature and the at least one feature does not exceed a descriptor distance threshold, and when a difference in coordinates of keypoint location of the candidate feature and coordinates of a keypoint location of the at least one feature does not exceed a keypoint distance threshold.

8. The computer-implemented method of claim 1, further comprising:
determining whether the candidate feature is repeatable and discriminable.

9. The computer-implemented method of claim 8, wherein the candidate feature is repeatable when a number of proximately located keypoints exceeds a repeatability threshold, and wherein the candidate feature is discriminable when a ratio of a number of proximately located keypoints in the feature database having a similar descriptor value to a total number of keypoints in the feature database having the similar descriptor value regardless of location exceeds a discriminability threshold.

10. The computer-implemented method of claim 8, further comprising:
deriving the new feature from the second set of features when the candidate feature is repeatable and discriminable, wherein the new feature is a single feature that is representative of the second set of features; and
removing the second set of features from the feature database in response to addition of the new feature to the feature database.

11. A computer-readable non-transitory medium including program code stored thereon, the program code comprising instructions to:
extract a first set of features from an image during object detection within the image by a mobile platform;
compare the first set of features to features stored in a feature database of an object recognition system;
determine a target object is present in the image based on some of the features included in the first set of features correlating with at least some of the features included in the feature database;
identify a candidate feature from the first set of features extracted from the image during object detection, the candidate feature belonging to the target object and not previously included in the feature database for identification of the target object;
determine a second set of features using a descriptor and a keypoint associated with the candidate feature, wherein the second set of features comprises the candidate feature and at least one feature selected from the feature database when the at least one feature is determined to have a descriptor similar to the descriptor of the candidate feature and a keypoint with a location within a threshold distance of a location of the keypoint of the candidate feature;
assign a score to the candidate feature, wherein the score is based on a circularity measure of the candidate feature; and
update the feature database of the object recognition system by adding the candidate feature or a new feature to the feature database based on the score.

12. The computer-readable non-transitory medium of claim 11, wherein the instruction to extract the first set of features from within the provided image includes instructions to apply a Scale-Invariant Feature Transform (SIFT) algorithm to the provided image.

13. The computer-readable non-transitory medium of claim 11, wherein the instructions to add the candidate feature to the feature database includes instructions to only add the candidate feature if the score of the candidate feature exceeds a score threshold.

14. The computer-readable non-transitory medium of claim 13, wherein the score is further based on an aspect of the candidate feature selected from a group consisting of a local measure of curvature and a measure of corner strength.

15. The computer-readable non-transitory medium of claim 11, wherein the candidate feature is added to the feature database when the candidate feature varies from features already included in the feature database based on a keypoint location of the candidate feature differing from keypoint locations of the features already included in the feature database by more than a threshold amount.

16. The computer-readable non-transitory medium of claim 11, wherein the candidate feature is added to the feature database when the candidate feature varies from features already included in the feature database based on a keypoint descriptor of the candidate feature differing from keypoint descriptors of the features already included in the feature database by more than a threshold amount.

17. An apparatus, comprising:
a memory;
a processor coupled to the memory and configured to:
capture an image with a camera;
extract a first set of features from within the captured image during object detection within the image;

compare the first set of features to features stored in a feature database of an object recognition system;

determine a target object is present in the image based on some of the features included in the first set of features correlating with at least some of the features included in the feature database;

identify a candidate feature from the first set of features extracted from the image during object detection, the candidate feature belonging to the target object and not previously included in the feature database for identification of the target object;

determine a second set of features using a descriptor and a keypoint associated with the candidate feature, wherein the second set of features comprises the candidate feature and at least one feature selected from the feature database when the at least one feature is determined to have a descriptor similar to the descriptor of the candidate feature and a keypoint with a location within a threshold distance of a location of the keypoint of the candidate feature;

assign a score to the candidate feature, wherein the score is based on a circularity measure of the candidate feature;

and update the feature database of the object recognition system by adding the candidate feature or a new feature to the feature database based on the score.

18. The apparatus of claim 17, wherein the instructions to extract the first set of features from within the captured image includes instructions to apply a Scale-Invariant Feature Transform (SIFT) algorithm to the captured image.

19. The apparatus of claim 17, wherein the instructions to add the candidate feature to the feature database includes instructions to only add the candidate feature if the score of the candidate feature exceeds a score threshold.

20. The apparatus of claim 19, wherein the score is further based on an aspect of the candidate feature selected from a group consisting of a local measure of curvature and a measure of corner strength.

21. The apparatus of claim 17, wherein the candidate feature is added to the feature database when the candidate feature varies from features already included in the feature database based on a keypoint location of the candidate feature differing from keypoint locations of the features already included in the feature database by more than a threshold amount.

22. The apparatus of claim 17, wherein the candidate feature is added to the feature database when the candidate feature varies from features already included in the feature database based on a keypoint descriptor of the candidate feature differing from keypoint descriptors of the features already included in the feature database by more than a threshold amount.

23. The apparatus of claim 17, further comprising a camera to acquire the captured image.

24. The apparatus of claim 17, wherein the apparatus is a wireless communication device, further comprising a network adapter configured to communicate with a server to query the feature database using the first set of features.

25. The apparatus of claim 24, wherein the wireless communication device is a cellular telephone and at least a portion of the feature database is received by the network adapter and modulated according to a cellular communication standard.

* * * * *